(12) United States Patent  
Ramamurthy et al.

(10) Patent No.: US 10,212,694 B2  
(45) Date of Patent: *Feb. 19, 2019

(54) WIRELESS MULTICAST COMMUNICATION

(71) Applicant: Apple Inc., Cupertino, CA (US)

(72) Inventors: Harish Ramamurthy, Cupertino, CA (US); Kapil Chhabra, Cupertino, CA (US); Matthew L. Semersky, San Jose, CA (US); Daniel R. Borges, San Francisco, CA (US); Charles F. Dominguez, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/618,960

(22) Filed: Jun. 9, 2017

(65) Prior Publication Data

US 2017/0280421 A1  Sep. 28, 2017

Related U.S. Application Data

(63) Continuation of application No. 14/088,898, filed on Nov. 25, 2013, now Pat. No. 9,681,418.

(Continued)

(51) Int. Cl.
*H04W 72/00* (2009.01)
*H04W 72/12* (2009.01)
(Continued)

(52) U.S. Cl.
CPC ......... *H04W 72/005* (2013.01); *H04L 1/1614* (2013.01); *H04L 1/1685* (2013.01); *H04L 1/1854* (2013.01); *H04L 1/1867* (2013.01); *H04L 1/203* (2013.01); *H04W 72/1289* (2013.01); *H04L 2001/0093* (2013.01)

(58) Field of Classification Search
CPC ....................... H04W 72/005; H04W 72/1289; H04L 1/203; H04L 1/1854; H04L 1/1685; H04L 1/1614; H04L 1/1867
See application file for complete search history.

(56) References Cited

U.S. PATENT DOCUMENTS 7,751,396 B2   7/2010 Kakani
8,139,593 B2   3/2012 Dravida et al.
(Continued)

*Primary Examiner* — Anez C Ebrahim
(74) *Attorney, Agent, or Firm* — Meyertons Hood Kivlin Kowert & Goetzel, P.C.; Jeffrey C. Hood

(57) ABSTRACT

This document describes multicast communication between wireless devices. A scheduling frame may be wirelessly transmitted by a wireless device. The scheduling frame may include a multicast address indicating a group of intended receiving devices for a payload frame. The scheduling frame may further include scheduling information indicating an order for the group of intended receiving devices to transmit acknowledgement information for the payload frame. A payload frame may also be wirelessly transmitted by the wireless device. The payload frame may include payload information intended for the group of intended receiving devices. Additionally, acknowledgement frames may be wirelessly received by the wireless device from at least a subset of the group of intended receiving devices. The acknowledgement frames may be received according to the order indicated in the scheduling information.

20 Claims, 3 Drawing Sheets

Related U.S. Application Data

(60) Provisional application No. 61/883,356, filed on Sep. 27, 2013.

(51) Int. Cl.
*H04L 1/16* (2006.01)
*H04L 1/18* (2006.01)
*H04L 1/20* (2006.01)
H04L 1/00 (2006.01)

(56) References Cited

U.S. PATENT DOCUMENTS

| | | |
|---|---|---|
| 8,472,365 B2 | 6/2013 | Liu et al. |
| 2007/0014266 A1* | 1/2007 | Kondo .............. H04W 74/0858 370/337 |
| 2007/0086370 A1 | 4/2007 | Jang et al. |
| 2007/0201468 A1* | 8/2007 | Jokela .................... H04L 12/18 370/390 |
| 2009/0103501 A1 | 4/2009 | Farrag et al. |
| 2009/0247089 A1* | 10/2009 | Budde ................... H04W 52/34 455/69 |
| 2009/0323608 A1 | 12/2009 | Adachi et al. |
| 2010/0254392 A1 | 10/2010 | Katar et al. |
| 2011/0096710 A1* | 4/2011 | Liu ....................... H04L 1/1614 370/312 |
| 2012/0163292 A1 | 6/2012 | Kneckt et al. |
| 2013/0039297 A1 | 2/2013 | Wang |
| 2013/0060962 A1 | 3/2013 | Wang et al. |
| 2013/0077554 A1 | 3/2013 | Gauvreau et al. |

* cited by examiner

WIRELESS MULTICAST COMMUNICATION

PRIORITY CLAIM

This application is a continuation of U.S. patent application Ser. No. 14/088,898 titled "Wireless Multicast Communication", filed on Nov. 25, 2013, which claims benefit of priority to U.S. Provisional Application No. 61/883,356 titled "Wireless Multicast Communication" and filed on Sep. 27, 2013, whose inventors are Harish Ramamurthy, Kapil Chhabra, Matt Semersky, Daniel Borges, and Charles Dominguez, both of which are hereby incorporated by reference as though fully and completely set forth herein.

FIELD

The present disclosure relates to wireless communication, and more particularly to multicast communication in wireless systems such as IEEE 802.11 wireless systems.

DESCRIPTION OF THE RELATED ART

Multicast communication refers to communication of information from a sender to a group (e.g., a "multicast group") of destinations simultaneously. While many wireless systems include some mechanisms for multicast communication, such mechanisms are sometimes subject to limitations with respect to their reliability, efficiency, and/or other attributes. Accordingly, improvements in this domain would be desirable.

SUMMARY

This document describes, inter alia, methods for wireless devices related to the performance of multicast communication, and describes wireless devices configured to implement the described methods.

The wireless multicast communication techniques described herein may be performed between a group of devices, of which one may be referred to as a "primary" or "multicast sender", and the remainder may be referred to as "secondaries" or "multicast destinations." The multicast destinations may be considered a multicast group.

In order to communicate data to the multicast group, the multicast sender may initially wirelessly transmit a scheduling frame. The scheduling frame may indicate that a payload frame will be subsequently transmitted, and that the payload frame is intended for the multicast group. The scheduling frame may also indicate an order in which feedback (e.g., acknowledgment) frames should be sent back by the multicast destinations.

The multicast sender may then wirelessly transmit the payload frame. The payload frame may be an aggregated frame (e.g., a frame which includes multiple higher network layer packets, such as an aggregate MAC protocol data unit (AMPDU) which includes multiple MAC protocol data units (MPDUs)).

At least a subset of the secondaries may then wirelessly transmit acknowledgement frames back to the primary. Each secondary may transmit an acknowledgement frame back to the primary according to the order indicated in the scheduling frame. It may be the case that each acknowledgement frame is a block acknowledgement (Block ACK or BA) frame, particularly if the payload frame is an aggregated frame. In such a case, the acknowledgement frame may provide an indication of whether or not a given destination has successfully received each individual packet within the aggregated payload frame.

The primary may subsequently schedule and transmit any number of additional payload frames to the multicast group in a similar manner. Such additional frames may include new packets and/or retry packets, e.g., based on feedback received as part of previous sequences.

The techniques described herein may be implemented in and/or used with a number of different types of devices, including but not limited to hearing aids, remote controls, wireless speakers, set top box devices, television systems, cellular phones, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
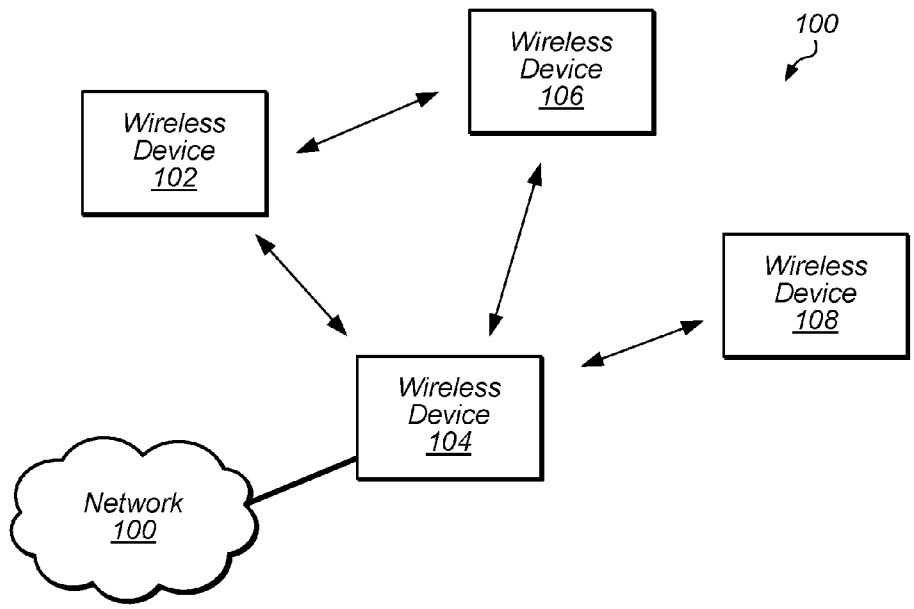
FIGS. 1-2 illustrate exemplary (and simplified) wireless communication systems.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 2:
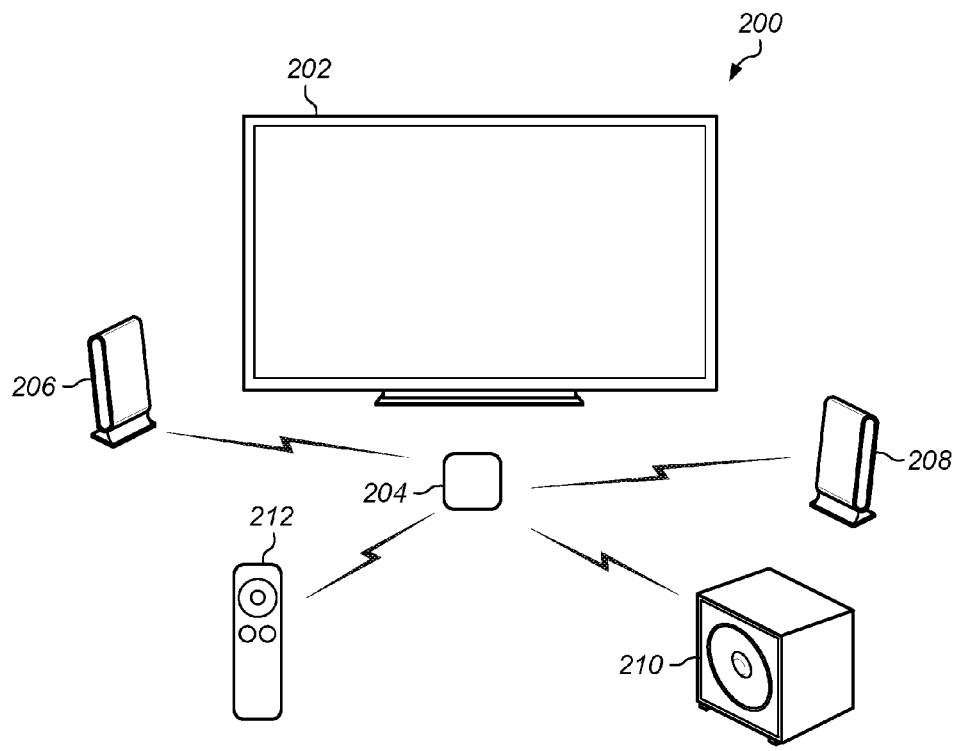

FIGS. 1-2—Communication System

FIG. 1 illustrates an exemplary (and simplified) wireless communication system 100. It is noted that the system 100 of FIG. 1 is merely one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or lesser numbers (i.e., any arbitrary number) of wireless devices.

As shown, the exemplary wireless communication system 100 includes multiple wireless devices 102-108 which communicate over a transmission medium. Some or all of the wireless devices may be substantially mobile "user equipment" (UE) devices. Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 104); alternatively, the wireless network may be an 'ad-hoc' or peer-to-peer based network. Note that it may be possible that the wireless network may include one or more 'hidden nodes'; for example, as shown, wireless device 108 may be within communication range of wireless device 104, but may not be able to detect (and/or be detected by) wireless devices 102 and 106. The wireless devices 102-108 may be configured to perform wireless multicast communication according to aspects of the present disclosure.

One or more of the wireless devices may be equipped to communicate with one or more external networks. For example, as shown, wireless device 104 may be communicatively coupled to network 100. The external network(s) may be any of a variety of types of networks, such as a cellular service provider's core network (e.g., via a cellular base station), the Internet, or an organization's intranet, among various possibilities.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi) and/or peer-to-peer wireless communication protocol (e.g., BT, Wi-Fi peer-to-peer, etc.) and at least one cellular communication protocol (e.g., GSM, UMTS (WCDMA), LTE, LTE-Advanced (LTE-A), 3GPP2 CDMA2000 (e.g., 1xRTT, 1xEV-DO, HRPD, eHRPD), etc.). Any or all of wireless devices 102-108 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates an exemplary wireless communication system 200 in which wireless multicast communication may be performed. As shown, the system 200 includes a display device 202, a set-top box 204, a left speaker 206, a right speaker 208, a sub-woofer 210, and a remote control device 212. The system 200 may, for example, be a home entertainment system. Note that the system 200 of FIG. 2 may be one possible more detailed example of the wireless communication system 100 of FIG. 1.

The set-top box 204 may store, and/or may have access to audio, visual, and/or audiovisual content via an external network (such as from a content server of a content provision service on the Internet) or via a networked storage device (not shown). Under certain circumstances (such as upon receiving a command from a user, possibly via the remote control device 212), the set-top box 204 may coordinate the various devices of the wireless communication system 200 to render audio, visual, and/or audiovisual content.

Under such circumstances, it may be desirable to distribute the content to multiple of the devices in the system 200 at the same time. For example, it may be desirable to provide Dolby Digital audio to each of the audio rendering devices 206, 208, 210 for rendering.

Note that although the exemplary system 200 illustrated in FIG. 2 represents one possible system in which the wireless multicast communication techniques described in this document may be performed, the techniques described herein may alternatively or additionally be performed in any number of other systems. For example, the techniques described herein may be used in other applications such as: for other home entertainment systems having different arrangements (e.g., multiple displays, different number of audio rendering devices, etc.); to bridge an 802.1 network with an 802.11 network; in conjunction with a videoconferencing system; for distributing a presentation to individual wireless presentation devices during a conference; for general audio/video or other data distribution to multiple devices; and/or other various possibilities.

Figure 3:
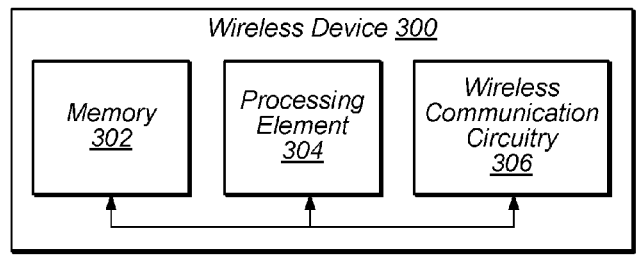
FIG. 3 illustrates a block diagram of an exemplary wireless device.

FIG. 3—Exemplary Block Diagram of a Wireless Device

FIG. 3 illustrates an exemplary block diagram of a wireless device 300 which may be configured for use in conjunction with various aspects of the present disclosure. The device 300 may be any of a variety of types of device and may be configured to perform any of a variety of types of functionality. For example, the device 300 may be a substantially portable device (a mobile device), such as a mobile phone, a personal productivity device, a computer or a tablet, a handheld gaming console, a portable media player, etc. Alternatively, the device 300 may be a substantially stationary device, such as a television, a subwoofer, speaker, or other audio rendering device, a set-top box, etc., if desired.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, including an antenna configured for wireless communication, among various possible components, and may alternatively be referred to as a 'radio'. If desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may providing processing capability for the wireless communication circuitry 306. The device 300 may be capable of communicating using any of various wireless communication technologies by way of wireless communication circuitry 306.

The device 300 may additionally include any of a variety of other components (not shown) for implementing device functionality, depending on the intended functionality of the device 300, which may include further processing and/or memory elements, one or more power supply elements (which may rely on battery power and/or an external power source) user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, and wireless communication circuitry 306, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

Figure 4:
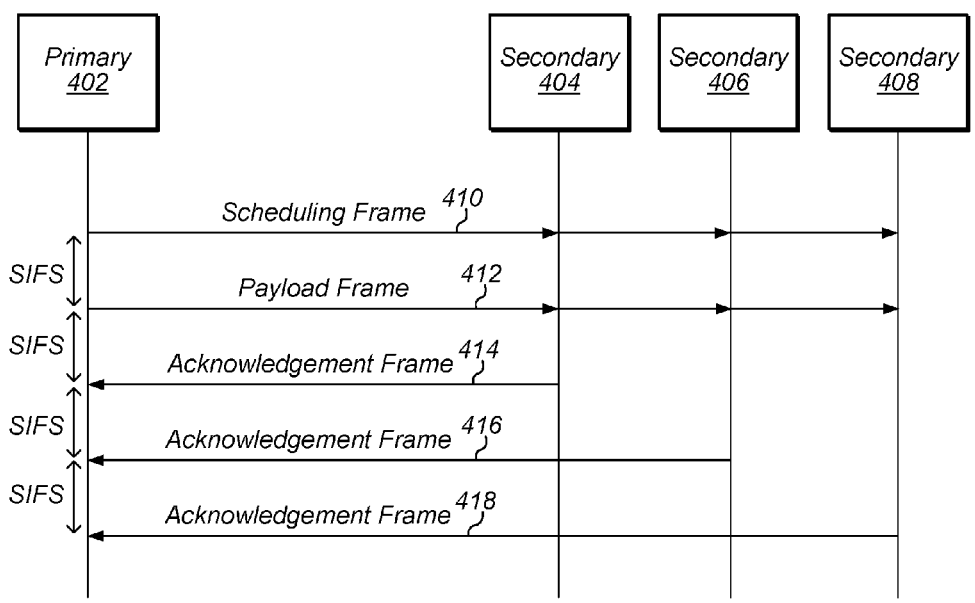
FIGS. 4-6 are signal flow diagrams illustrating aspects of exemplary methods for wireless multicast communication.
Figure 5:
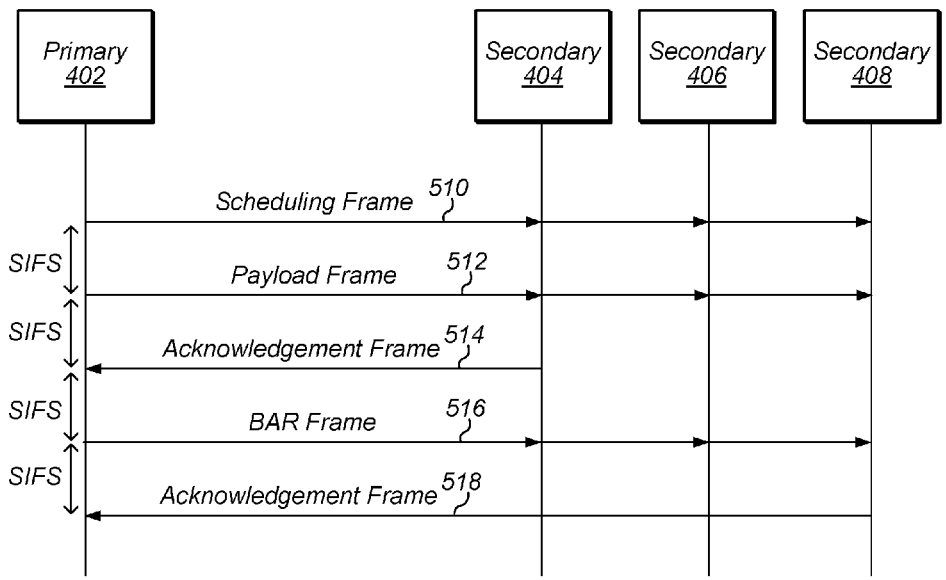
Figure 6:
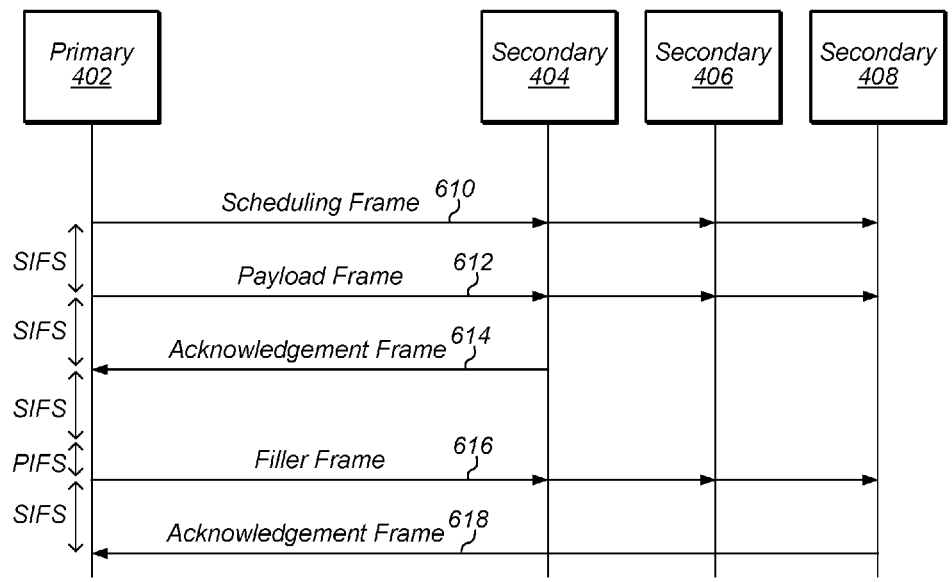

As described herein, the device 300 may include hardware and software components for implementing features for performing wireless multicast communication, such as those described herein with reference to, inter alia, FIGS. 4-6.

FIGS. 4-6—Communication Flow Diagrams

Multicast delivery may be used to distribute data to multiple devices. As noted with respect to FIG. 2, some applications include audio/video (A/V) distribution to multiple stations, bridging an 802.1 network to an 802.11 network, and generally distributing data to multiple stations, among various such applications.

Infrastructure-based or peer-to-peer device discovery mechanisms may be used by wireless devices to detect other wireless devices. Using any of a variety of such techniques, a multicast group may be formed, including selection of a multicast sender and multicast receivers, which may also be referred to as the "group primary" and "group secondaries" respectively. The multicast group may be uniquely identified by a multicast address as part of this process. FIGS. 4-6 are communication/signal flow diagrams illustrating a scheme that may be used for reliable multicast communication once such a multicast group has been formed. FIG. 4 relates, in particular, to a method for a multicast sender/primary 402 to perform multicast communication with a group of multicast receivers/secondaries 404, 406, 408, while FIGS. 5-6 illustrate exemplary additional possible aspects of such a method. Note that for any given multicast communication sequence according to the methods of FIGS. 4-6, portions may be implemented just by the multicast sender 402, while other portions may be implemented by each of the multicast receivers 404, 406, 408 in the multicast group. The multicast communication may be performed via wireless communication, such as via IEEE 802.11 (Wi-Fi) communication.

The methods shown in FIGS. 4-6 may be used in conjunction with any of the computer systems or devices shown in the above Figures, among other devices. Some of the method elements shown may be performed concurrently, in a different order than shown, or may be omitted. Additional method elements may also be performed as desired. As shown, the methods may operate as follows.

In 410, the multicast sender 402 may transmit a scheduling frame. Each of the multicast receivers 404, 406, 408 may receive the scheduling frame. The scheduling frame may include a multicast address indicating a group of intended receiving devices (e.g., including the secondaries 404, 406, 408) for a payload frame. The scheduling frame may also include scheduling information indicating an order in which receiving devices of the group of intended receiving devices are scheduled to transmit acknowledgement information for the payload frame.

In 412, the multicast sender may transmit the payload frame. Each of the multicast receivers 404, 406, 408 may receive the payload frame. The payload frame may include payload information configured for multicast communication to the group of intended receiving devices (i.e., the multicast group). The payload frame may be an aggregate frame. For example, the payload frame may be a physical layer (PHY) protocol data unit (PPDU) which includes multiple media access control (MAC) protocol data units (MPDUs) (which may also be considered subframes). Alternatively, the payload frame may include a single MPDU. However, utilizing an aggregate frame (or aggregate MPDU / AMPDU) as the payload frame may improve wireless medium efficiency.

In 414, multicast receiver 404 may transmit an acknowledgement frame. In 416, multicast receiver 406 may transmit an acknowledgement frame. In 418, multicast receiver 408 may transmit an acknowledgement frame. The multicast sender may receive acknowledgement frames from at least a subset of the group of intended receiving devices (e.g., secondaries 404, 406, 408). The acknowledgement frames may be received according to the order indicated in the scheduling information. For example, in the exemplary scenario of FIG. 4, the scheduling frame may have indicated that secondary 404 is scheduled to transmit an acknowledgement frame first, secondary 406 is scheduled to transmit an acknowledgement frame second, and secondary 408 is scheduled to transmit an acknowledgement frame third.

Each acknowledgement frame may provide positive acknowledgement of correctly received payload information. If the payload frame is an AMPDU, each acknowledgement frame may include information indicating whether or not each MPDU in the AMPDU has been correctly received; for example, an acknowledgement frame communicated in response to an AMPDU might include a bitmap corresponding to the AMPDU, where a '1' in the portion of the bitmap corresponding to a particular MPDU of the AMPDU indicates successful receipt of that particular MPDU, while a '0' in the portion of the bitmap corresponding to a particular MPDU of the AMPDU indicates unsuccessful receipt of that particular MPDU. Other forms of acknowledgement information are also possible.

Taken together, the scheduling frame, the payload frame, and the acknowledgement frames may be considered to form a multicast communication sequence. Over the course of a multicast session, multiple multicast communication sequences may be performed. Each may include a scheduling frame, a payload frame, and one or more acknowledgement frames.

Each successive multicast communication sequence may include new payload data and/or retry payload data. If the payload frames are aggregate frames, in some cases a combination of new and retry MPDUs may be transmitted. For example, for each multicast communication sequence, the multicast sender 402 might formulate the payload frame to begin at the earliest packet sequence number (SN) which has not yet been acknowledged to be successfully received by all multicast receivers in the multicast group, and may include subsequent packets in a transmit queue up to a maximum configured size of the payload frame.

To facilitate this, the multicast sender 402 may track which MPDUs to be transmitted have been successfully received by all multicast receivers. For example, the multicast sender 402 may store a bitmap for MPDUs in its transmit queue, or use any of a variety of other techniques for tracking whether or not each MPDU in its transmit queue has been acknowledged by all intended receivers. Note that in some cases (e.g., to reduce system complexity at the multicast sender 402), the multicast sender 402 may not necessarily store information indicating whether or not each individual intended receiver has acknowledged each transmitted MPDU, but may instead simply track, for each transmitted MPDU, whether or not all intended receivers have acknowledged that MPDU.

In such cases, each multicast receiver may track whether or not it has successfully received each transmitted MPDU individually, and may provide the acknowledgement information in the acknowledgement frames based both on the current multicast communication sequence and any relevant previous multicast communication sequences (e.g., using records stored by the multicast receiver).

Note that such information may also be used on the receiver side to determine which (if any) payload information to decode for each multicast communication sequence. For example, a multicast receiver might have stored information indicating that it has previously received a particular (e.g., retry) MPDU which is included in a current payload frame. The multicast receiver might store a record of the SNs of any packets successfully received as part of the multicast group, for example, and might accordingly be able to determine that the SN of the MPDU in question matches an SN recorded as having previously been successfully received. In such a case, the multicast receiver may drop that particular MPDU rather than decode it during the current payload frame (e.g., in order to conserve power). Since the multicast receiver would already have the information contained in that particular MPDU, the multicast receiver may still provide positive acknowledgement for that MPDU in its acknowledgement frame for the current payload frame, despite having dropped the packet in the current payload frame. This may be particularly important if, as described above, the multicast sender 402 is tracking acknowledgements to individual MPDUs in the aggregate rather than on a receiver-by-receiver basis.

Note that the scheduling frame may also include a variety of additional information, if desired. For example, the scheduling frame may include information indicating the duration of the payload frame, and the duration of each acknowledgement frame in which acknowledgment information is to be transmitted. Together with the information indicating the order in which receiving devices of the group of intended receiving devices are scheduled to transmit acknowledgement information for the payload frame, this may enable each multicast receiver in the multicast group to calculate when it is scheduled to transmit an acknowledgement frame. This may significantly improve the likelihood that the multicast receivers communicate their acknowledgement frames according to the timing and order specified by the scheduling frame. For example, even if one or more of the multicast receivers loses the payload frame entirely, the scheduling frame may include sufficient information to enable each of the multicast receivers to schedule (and transmit according to that schedule) their acknowledgement frames. In case a multicast receiver were to lose the payload frame entirely, for example, that multicast receiver might communicate a negative acknowledgement (NACK) or null (all 0s) bitmap in its acknowledgement frame, at a time calculated based on the information in the scheduling frame.

It is also possible for a multicast sender, using the scheduling scheme described above, to communicate different frames of a multicast communication sequence at different physical layer (PHY) rates in order to balance wireless medium efficiency, reliability, and interference considerations. For example, the scheduling frame may be communicated using a different modulation and coding scheme (e.g., a more robust PHY rate) than the payload frame. The acknowledgement frames may be communicated at the same PHY rate as the scheduling frame (or the same PHY rate as the payload frame, if desired), or may be transmitted at a further different PHY rate.

By communicating the scheduling frame at a relatively robust rate (e.g., a PHY rate which is lower than the maximum PHY rate supported by current medium conditions), receivers (both in the multicast group and outside of the multicast group) may be given an improved likelihood of correctly receiving the scheduling frame. By then communicating the payload frame (which may be significantly longer than the scheduling frame or the acknowledgement frames as it may carry the payload information (e.g., data) intended for the multicast receivers) at a higher PHY rate (e.g., a PHY rate at or near the maximum PHY rate supported by current medium conditions), the wireless medium may be used more efficiently for that portion of the multicast communication sequence.

Note additionally that any of a variety of link adaptation techniques may be implemented if desired, e.g., such that the PHY rate used for the payload frames of multicast communication sequences may vary over time, in order to provide further control and optimization of the balance between link efficiency and reliability and robustness. For example, the PHY rate used for payload frames may be determined at least in part based on a measure of packet error rate (e.g., based on individual MPDUs) and/or frame error rate (e.g., based on entire payload frames) as determined based on one or more previous sets of acknowledgement frames (corresponding to one or more previous multicast communication sequences) received by the multicast sender.

As noted above, the acknowledgement frames may also be communicated at a relatively robust rate. Similar to the use of a robust rate for the scheduling frame, this may improve the likelihood of the multicast sender correctly receiving those acknowledgement frames, which may be worthwhile despite the potential loss of wireless medium efficiency, because of the relatively short length of each acknowledgement frame and their particular importance in determining characteristics (e.g., payload PHY rate, which MPDUs are to be included in the payload frame, etc.) of subsequent multicast communication sequences.

Note that as one possibility (e.g., as may be typical in IEEE 802.11), acknowledgement frames (e.g., ACK or BA frames) may be transmitted at a PHY rate which is mapped in a defined manner to the PHY rate of the received frame being acknowledged. The PHY rate of the received frame may also be a robust rate (e.g., depending on channel conditions and a link adaptation algorithm used). Using such a mapping may simplify acknowledgement rate selection for the receiver. Further, since the transmitter may also know this mapping, the transmitter may use the same mapping to determine the PHY rate for the scheduling frame, if desired.

Additionally, it should be noted that the PHY rate(s) used for scheduling frames and acknowledgement frames may not need to be fixed. In other words, in some cases, rather than fixing the PHY rate for the scheduling frames and acknowledgement frames as the lowest (most robust) possible rate, this rate could also be changed based on medium conditions. Using a mapping between the PHY rate of the payload frame and the scheduling and/or acknowledgement frame(s) (e.g., assuming a link adaptation algorithm is used to dynamically modify the PHY rate used for the payload frame) may also accomplish this, though it will be recognized that alternate mechanisms are also possible.

If desired, the scheduling frame may also include information indicating a total duration of the multicast communication sequence of which it is a part, including the length of the scheduling frame, the payload frame, and all scheduled acknowledgement frames of that multicast communication sequence (and taking into account expected gaps, such as short interframe spaces (SIFSs) illustrated in the exemplary scenario of FIG. 4, between frames). As noted above, since the scheduling frame may be communicated at a relatively robust PHY rate, this duration information is likely to be successfully received, both by receivers in the multicast group and any other receivers that might be within communicative range. The duration information indicated in the scheduling frame may thus provide network allocation vector (NAV) protection against the communication medium being co-opted (potentially resulting in interference) by another node in the network (such as a hidden node and/or a node which is not a member of the multicast group) during the multicast communication sequence.

The frames of a multicast communication sequence may be scheduled and communicated with minimal gaps between frames, both in order to utilize the medium efficiently and in order to maintain NAV protection throughout the sequence. For example, as shown, SIFS gaps, which may be used in conjunction with IEEE 802.11 wireless communication, may be on the order of tens of microseconds, (e.g., 10 µs, 16 µs, etc.). Other gaps (including gaps having different orders of magnitude) may be used if desired. Note that it may be the case that the gaps between frames in a multicast communication sequence such as described herein may be formulated so as to leave sufficient time for a station to switch from a transmit mode to a receive mode, or vice versa.

As noted above, FIGS. 5-6 illustrate certain additional aspects of the multicast communication scheme illustrated in FIG. 4. In particular, FIG. 5 illustrates a scenario in which, after a scheduling frame 510, a payload frame 512, and an acknowledgement frame 514 from secondary 404, the primary 402 may transmit an acknowledgement request frame 516. The acknowledgement request frame 516 may be a regular 802.11 block ack request (BAR) frame, a specific multicast BAR, or any of a variety of other types of request frames. Such a scenario may enable the primary to take finer-grained control of the transmission sequence, which may be useful in certain circumstances. For example, if the acknowledgement frame 514 indicates that all packets in the payload frame 512 were lost, the transmitter 402 may not solicit further acknowledgements and start the next transmission at this point (i.e., retry immediately) using an acknowledgement request. As another example, if a secondary (e.g., secondary 406 or secondary 408) doesn't respond with an acknowledgement frame as scheduled, the transmitter 402 may truncate the sequence, capture the medium again (e.g, at a PCF interframe space (PIFS) boundary), send an acknowledgement request, and continue soliciting acknowledgment frames. For example, as shown, acknowledgement request frame 516 may solicit an acknowledgement from secondary 508, and in response, secondary 508 may transmit an acknowledgement frame 518.

FIG. 6 illustrates another possible scenario which may occur when using the multicast scheme described herein, in particular in the event that a multicast receiver does not transmit its acknowledgement frame as scheduled. In the illustrated scenario, after a scheduling frame 610, a payload frame 612, and an acknowledgement frame 614 from secondary 404, an acknowledgement frame from secondary 406 may be expected (e.g., following an SIFS gap after acknowledgement frame 614). However, the expected acknowledgement frame may not be transmitted as scheduled, and so the multicast sender 402 may detect that no acknowledgement frame is being received at a time when an acknowledgement frame is scheduled. In such a case, the multicast sender 402 may (e.g., subsequent to the time at which the missing acknowledgement frame was scheduled to begin being transmitted by a suitable interval, such as a PCF interframe space (PIFS), as shown) then communicate a filler frame 616 for a remaining scheduled duration of the scheduled acknowledgement frame. The filler frame 616 may help maintain NAV protection for the multicast communication sequence, as a node (e.g., a hidden node and/or a node which is not a member of the multicast group) which might otherwise contend for medium access and thereby interrupt the multicast communication sequence may back off as a result of detecting the filler frame. The content of the filler frame may be ignored by the multicast receivers. The multicast communication sequence may then continue as originally scheduled, for example with transmission of acknowledgement frame 618 by secondary 408, as shown.

The multicast communication scheme detailed in FIGS. 4-6 may be used for the communication of A/V data, and although illustrated in an exemplary scenario with three multicast receivers, the scheme may be used with any number of (including less than three or greater than three) multicast receivers. Some A/V applications have strict bandwidth and latency requirements, and since wireless medium capacity is generally fixed (i.e., does not change with varying number of stations/destinations), it may be difficult to support A/V bandwidth and latency requirements with unicast communication as the number of destinations involved increases.

The multicast communication scheme detailed in FIGS. 4-6 may also be used for bridging 802.1 and 802.11 networks. An 802.1 bridge may forward a frame received on one port to a sub-set of ports. An 802.1 bridge may use such a capability, for example, to support different virtual local area networks, and/or to support port blocking for Spanning Tree. On an 802.11 network, an access point (which may be a standalone / dedicated access point or a more general wireless device acting as an access point) acting as an 802.1 bridge may forward a frame to a subset of ports in a manner that avoids problems with multicast reflection. In particular, such an 802.11 AP may tag or signal which subset of stations in the 802.11 network should process a given transmitted packet.

Note that application of the methods of FIGS. 4-6 to 802.1 to 802.11 network bridging may vary somewhat in implementation details from application of the methods of FIGS. 4-6 to A/V wireless multicast communication. For example, whereas in A/V communication the multicast address may identify a particular multicast group, which may be fairly static, in 802.1 to 802.11 network bridging, the multicast address may be a special global address (e.g., in order to avoid creating a unique multicast address for each possible subset of stations on the 802.11 network). All receivers in the 802.11 network may thus be expected to receive packets sent to the special multicast address, and the multicast address may be used to signal special 802.1 to 802.11 handling. In this case, the bitmap inside a SCH frame may be used to signal which secondaries are to respond to a payload frame associated with that SCH frame.

In other words, the scheme illustrated in and described with respect to FIGS. 4-6 may be used for a variety of applications, including distribution of audiovisual content to multiple stations and 802.1 to 802.11 network bridging, among various applications.

Additional Information

The following information is provided for illustrative purposes of certain exemplary details which may be used for certain implementations, are provided by way of example only, and are not intended to be limiting to the disclosure as a whole. Numerous alternatives to and variations of the details provided hereinbelow are possible and should be considered within the scope of the present disclosure.

Frame Details

As previously noted, the primary of the multicast group may initiate a multicast sequence by transmitting a scheduling frame, which may also be referred to as an "SCH frame" or simply "SCH". As one example, the SCH frame may include the following information.

The SCH frame may include type/subtype information identifying the SCH frame as an SCH frame. Duration information, indicating the length of the entire multicast communication sequence (e.g., in order to provide NAV protection for the sequence), may also be included. The multicast group address may be included as the receiver address, and the primary's address may be included as the transmitter address. One or more mode bits may also be included, indicating a mode in which SCH frame may be used. A bitmap of secondary indices for which responses are requested may also be included. Additionally, an indication of the length of the payload frame (which may be a PHY protocol data unit (PPDU)) to follow may be included. Note that while if the PPDU is a typical payload frame, the PPDU length field may have a non-zero value, as a special case the PPDU length may be set to zero in certain scenarios. In such a case, the secondaries may effectively be prompted to send acknowledgement frames (e.g., block acknowledgements or BAs) immediately following the SCH frame (e.g., according to scheduling order and utilizing specified inter-frame spacing (e.g., SIFS)). This special case may be one way of implementing a multicast BA request (BAR) frame. More generally, use of a PPDU length or duration field may facilitate calculation of a time-offset at which a secondary may transmit its acknowledgement frame if the PPDU is lost. Further, an indication of the amount of time reserved per-uplink (a 'response duration') may be included in the SCH frame. This may match BA duration, in the case in which the expected responses will be BAs. A start sequence number (which may be the lowest sequence number as yet unacknowledged by all members of the multicast group) may also be included. Finally, a frame check sequence (FCS) (such as a cyclic redundancy check (CRC)) may be included in the SCH frame in order to facilitate receivers' ability to confirm correct reception of the SCH frame.

The PPDU may include payload data that is to be transmitted to the destinations in the multicast group. For example, the PPDU might include A/V data for an A/V application, or might include packets to be bridged in an 802.1 to 802.11 bridging scenario. The PPDU may include multiple media access control (MAC) protocol data units (MPDUs) (i.e., may be an aggregate MPDU or AMPDU) or a single MPDU. The PPDU contents (e.g., the AMPDU contents) may be constrained by various characteristics (e.g., RxAMPDUFactor, MaxWindowSize, MaxMPDU-Size, etc.) of the multicast destinations. If the PPDU includes an AMPDU, the AMPDU may include any combination of new or retry multicast MPDU frames. All multicast MPDUs of the AMPDU may be addressed to the same multicast address.

As previously noted, after the primary transmits the payload and separated by an SIFS (or other) gap between each frame, the secondaries may transmit acknowledgement frames (e.g., block acknowledgement frames or BAs, in the case of an AMPDU). As one example, each acknowledgement frame may be a BA frame and may include the following information.

A type/sub-type indicator may identify the BA frame as a multicast BA frame. Duration information may be included to maintain NAV protection for the remainder of the transaction/sequence. The primary's address may be included as the receiver address, and the secondary's address may be included as the transmitter address. The multicast address may also be included. The BA frame may include a bitmap indicating which MPDUs of the PPDU have been successfully received by the secondary. Finally, a FCS may also be included in the BA frame.

Multicast Transmission Setup

For unicast transmissions in 802.11, blockack capability negotiation (e.g., window size, AMSDU and AMPDU support) is done using ADDBA request and ADDBA response management frames. Further, aggregation parameters (like max aggregate length, aggregation density) are conveyed in high throughput (HT) or very high throughput (VHT) capability IEs. The same mechanism could be extended for setting up one-to-many group BA session but it may incur significant overhead, as there could be multiple rounds of such negotiations when dealing with multiple peers.

Instead, as one possibility for use in a multicast scheme such as described herein, the group primary may unilaterally decide the group BA session parameters. After peer-to-peer discovery, the primary may be aware of the link capabilities of each peer (e.g., max aggregate size, rate sets etc.). The primary may accordingly take a minima of all the capabilities advertised by the secondaries and publish the parameters. This mechanism may be used for aggregation and rate-set parameters as well. Note that devices participating in the multicast distribution scheme may be required to support certain mandatory features.

The group primary may also determine the mapping of secondary addresses to a secondary index. The secondary index may used for efficient addressing while soliciting feedback for multicast transmission. This mapping may be arbitrary and could be stateless, for example purely based on the lexical order of MAC address.

All these parameters—blockack, aggregation, rate-set, secondary address mapping—may be termed as group session parameters and may be determined by the group primary as part of multicast transmission setup.

Once the group session parameters are determined, the group primary may announce these parameters to all secondaries so that they can adopt the parameters. To deliver this frame, the group primary may broadcast it multiple times or send it as unicast to each secondary.

The group primary may continue to periodically send these parameters to ensure they are received, and/or for the benefit of a new secondary wishing to join the group.

Blockack Handling

In a unicast blockack session, the notion of a completed packet or done packet is straightforward and is same at both originator and recipient. This is especially true for full-state BA case. A packet missing on recipient will be marked as un-acknowledged on originator and a packet un-acknowledged on originator will be missing on recipient. Note that these two scoreboards may get out of sync intermittently, say due to BA packet loss, but by design the packet status will be tracked on both sides. This tracking is usually done through blockack window bitmap and start sequence number by each side.

The same mechanism can be extended to one-to-many group BA session with some minor modifications, for example according to the following scheme.

A completed packet for group BA session may imply that either all secondaries have successfully received the packet or the primary has exhausted its attempts on transmitting the packet. The primary may exhaust attempts on transmitting a packet for any of various reasons. Each packet could have a packet expiry time; for example, this could be a small number like 20 ms (or any other number). Each packet might also or alternatively have a limited number of retries, though this may not be needed if the primary relies on packet expiry. As another alternative (or addition), early buffer-full drop may be enabled: it may be preferable to drop packets in the front of queue, especially for packets with short expiry. For example, before scheduling any transmission, the primary might look at its transmission queue, and if the queue depth exceeds a threshold, it may drop packets with a configured probability. This may be uncommon in many implementations, however may occur, for example, due to a sudden burst of packets from higher network layers or intermittent network busyness.

For a group BA session, the primary may maintain a 'scoreboard' of completed packets for the multicast group. The Start Sequence Number may be the lowest completed packet for the group. The bitmap may track the list of completed packets starting from Start Sequence number. This implies that even if one secondary (e.g., of many) hasn't received a packet it will be marked as 0 in the primary's bitmap. Note that there is a potential for asymmetry in the SSN and blockack bitmap between the primary and secondaries. For example, one secondary could be missing a packet which may be reflected in the primary's blockack bitmap, while other secondaries could have received the packet previously and thus carry a 1 in their bitmap for that packet.

The other aspects of group BA window handling may be similar to unicast blockack window handling. On packet completion, the SSN may be moved to the last packet not-completed in the group BA session. Secondly, if a scheduled packet's sequence number is more than window size ahead of group BA's start sequence number, it may cause the group BA window to move (e.g., post transmission). Finally, the primary may be enabled to explicitly move the group BA window by sending a multicast BAR frame.

The primary, based on the SSN and bitmap of completed packets, will determine the next set of packets to attempt to transmit. To illustrate, assuming the number of peers is <r>, the next (<n+1>th transaction) A-MPDU to be transmitted can be determined as follows:

curr_bmp_grp_n=!(rcvd_bmp_1_n && rcvd_bmp_2_n && rcvd_bmp_r_n)

curr_tx_bmp_grp_n+1=(curr_bmp_grp_n & tx_bmp_avail)

curr_tx_bmp_grp_n+1|=tx_new_pkts where:

curr_bmp_grp_n is the bitmap of packets still incomplete after <n> transmissions;

curr_tx_bmp_grp_n+1 is the bitmap of packets that will be sent as <n+1> transmission;

tx_bmp_avail is the bitmap of available packets at transmitter, after attempt exhaustion;

tx_new_pkts is the bitmap of packets which haven't been attempted once; and rcvd_bmp_i_k is the bitmap received from peer "i" after "k" transmissions, starting from current group SSN.

If received bitmap from a particular peer is missing, the primary can explicitly send a BAR to fetch that BA again, or replace the bitmap with !curr_bmp_grp_n−1, i.e. assume that all packets transmitted in the last transaction were lost.

According to this scheme, the primary may need to track curr_bmp_grp_n, curr_tx_bmp_grp_n, and SSN after every <n>th transaction.

Aggregation Handling

The group primary may limit the maximum length of aggregate to be the minima of maximum aggregate length for all secondaries. Further, there may be a maximum aggregation length restrictions due to the PHY rate used for A-MPDU transmissions.

To improve wireless medium efficiency, the primary may wait for at least an amount of time defined as "min wait time transmit watermark" or "aggregation watermark" to fill the aggregation buffer. This parameter may be configured for the particular session and take into the account the maximum latency.

Rate Adaptation

To maximize wireless medium efficiency, an optimal rate should be chosen for multicast distribution. If the rate is too conservative, the throughput and/or latency requirements may not be met; if rate is too aggressive, it may lead to poor reliability and excessive retries. Thus, a control mechanism for multicast which tracks the wireless medium conditions for all secondaries may be used.

Since the packets are to be delivered to each secondary, one strategy would be to follow the slowest or weakest secondary. This would be sufficient insofar as the slowest receiver can be identified deterministically. Due to the dynamic nature of wireless media, a secondary which is currently slowest may not always be the slowest, and thus in practice, this may not be feasible or may lead to poor wireless medium utilization (e.g., due to excessive polling). A more generic metric to track the multicast link status may thus be desired.

As one such metric, the multicast link status can be determined by tracking the frame error rate for multicast distribution. In unicast, frame error rate is simply the number of failures over number of attempts. A similar technique may be extended to multicast, with some modifications.

To illustrate, consider a scenario with a primary and two secondaries. Assume that the primary transmitted packets numbered 1 to 10. Secondary1 reports all packets received except #2 and #3, and Secondary2 reports all packets received except #3 and #4. From a unicast perspective, the FER for both secondaries is 2/10. But since the primary has to transmit three packets (#2 to #4) in the next attempt the effective multicast FER is 3/10 and not 2/10 or 2×2/10.

Next consider the case that, upon retrying, Secondary1 receives #3 and #4 and Secondary2 receives all packets. Since the primary has to again re-transmit #2, the instantaneous multicast FER is 1/3.

Note that even if Secondary1 didn't receive packet #4 in this retry but it did in the original attempt, this may not contribute to the multicast FER, as the transmitter doesn't have to transmit packet #4 again.

Thus, multicast FER can be tracked based on number of multicast attempts and multicast failures. In the above example, after original attempt, the multicast FER is 3/10, and after the retry it is (3+1)/(10+3)=4/13.

Since the multicast FER is generic, there may be no need to track all or a subset of secondaries; the metric may automatically track the slowest receiver(s).

As previously introduced in the BlockAck Handling section, assuming:

curr_bmp_grp_n: bitmap of packets still incomplete after <n> transmissions;

curr_tx_bmp_grp_n: bitmap of packets sent at <n>th transmission;

num_fail_grp_n=num_ones(curr_tx_bmp_grp_n & curr_bmp_grp_n);

num_att_grp_n=num_ones(curr_tx_bmp_grp_n);

num_fail_grp=sum (num_fail_i_k), for k=1 to n; and num_att_grp=sum (num_att_i_k), for k=1 to n; then Multicast FER=(num_fail_grp)/(num_att_grp).

Once the multicast FER is determined, based on certain FER thresholds the PHY rate could be changed. For example, if the FER exceeds a certain threshold, the rate might be dropped, while if the FER drops below a certain (e.g., different) threshold, the rate might be increased.

Generally, the FER threshold for unicast may be tied to the nominal probability of frame error. For example, if the nominal probability of frame error is 10%, the FER threshold may be set for 10%, such that if the FER exceeds 10%, the rate will be dropped. It may be implicitly assumed (and generally, though not necessarily, valid) that dropping the PHY rate will decrease FER.

For multicast, the probability of error may be compounded, as there may be multiple secondaries. For example, if the probability of random error to one secondary is Pu, the probability it will be received by all secondaries may be $(1-Pu)^n$ where <n> is the number of secondaries.

$$Pm = 1-(1-Pu)^n$$

$$1-Pu = (1-Pm)^{(1/n)}$$

$$Pu = 1-(1-Pm)^{(1/n)}$$

Thus, if a FER of Pm is desired, the unicast FER Pu should be:

$$1-(1-Pm)^{(1/n)}$$

If FER is tracked on a multicast link-level, the same FER threshold as used for unicast link may be used. But if FER is tracked for the slowest receiver, the updated FER Pu, as computed above, may be used.

In some instances, it may be preferable to keep rate of change of PHY rate to be conservative for multicast transmissions. This may be achieved, for example, by making the rate change state machine run slower, by using longer timeouts for trying higher rates, and/or by any of a variety of other means. A slightly conservative FER threshold for rate change may also be used, if desired.

One possible drawback of using raw FER may be that it may not be possible to distinguish packet loss due to interference from packet loss due to a poor wireless channel. This can be mitigated for multicast transmissions. For example, if all receivers drop the same packet, it may strongly indicate interference. A metric that tracks the number of such packet failures may be useful to determine the interference level.

Assuming the rate adaptation will adapt to a good PHY rate, a relatively conservative initial rate may be acceptable. As one example, a slightly conservative rate may be selected based on assessed link quality (for example, received signal strength indicators (RSSIs)) of all secondaries.

Assessment of Group Conditions

The group primary may be responsible for tracking the status of all secondaries in the group. This may include the link conditions to each secondary as well as membership information. The group primary may periodically pass this info to its higher network layers as well. Note that group conditions may be tracked even in the absence of data traffic to reduce stream setup time.

When there is sufficient data traffic, the per-peer statistics can be tracked as follows. As previously introduced, assuming:

curr_bmp_grp_n is the bitmap of packets still incomplete after <n> transmissions;

curr_tx_bmp_grp_n+1 is the bitmap of packets that will be sent as <n+1> transmission; and rcvd_bmp_i_k is the bitmap received from peer "i" after "k" transmissions, Per-peer statistics can be computed as follows:

num_fail_i_n=num_ones (curr_tx_bmp_grp_n & ! rcvd_bmp_i_n); and num_att_i_n+1=num_ones (curr_tx_bmp_grp_n+1 & !rcvd_bmp_i_n).

Further:

num_fail_i=sum (num_fail_i_k), for k=1 to n; and num_att_i=sum (num_at_i_k), for k=1 to n FER for a particular peer may thus be num_fail_i/num_att_i.

Note that it may be preferable that both num_fail and num_att are not updated in the middle of a transmission.

Further packet loss due to interference can be inferred from the following:

num_intf_n=num_ones (curr_tx_bmp_grp_n & (!rcvd_bmp_1_n & !rcvd_bmp_2_n . . . & ! rcvd_bmp_r_n)

num_intf=sum (num_intf_k), for k=1 to n

In addition to packet statistics, the group primary may also track RSSI for each peer based on received frames (including acknowledgements) and CCA for current link.

As noted above, the group primary may maintain a membership list of secondaries and link quality info in the absence of a data stream as well.

If there is not enough traffic, the primary will explicitly probe the secondaries to gather link quality info. This may be achieved by sending out a "Secondary" Poll frame. The group primary may send this as a multicast frame.

The periodicity of such a probe may be determined by the higher network layers and configured during group setup. Note that the periodicity may put an upper bound on how quickly the primary can detect the loss of a secondary.

If a secondary is not responding or there are excessive retries, the group primary may poll that secondary using a unicast frame.

Transmit Opportunity Handling

The primary may choose to use transmit opportunity (TXOP) or bursting for multicast. The transmissions will adhere to the same rules as unicast (for example CF-End). Note that TXOP may not be defined for the particular access category but the primary may still burst traffic for improving medium efficiency. This may be particularly effective when retrying packets.

The primary may continue transmission in the same TXOP or burst as long as it receives all solicited BAs. Note that even if a solicited BA indicates no packets received, receipt of the BA may still effectively imply that the TXOP or burst sequence is maintained.

Handling BA Loss

In unicast, if a BA or similar response frame is lost, the transmitter may assume it has lost control of the wireless medium. It may then double its contention window (max capped at CWmax) and run EIFS.

For multicast, this may be relaxed, as the former is a conservative approach. Multiple options are possible. As a first option, if the ratio of missing BAs over solicited BAs is greater than a certain threshold, then the regular response-failure-mechanism may be invoked. As one example, for majority loss this threshold might be 50%. As a second option, the contention window may be modified based on a BA loss ratio. For example:

$CWn$=ba_loss_ratio? $CWo*(ba\_loss\_ratio+1)$: $CWmin$

EIFS may be invoked for 100% BA loss.

As previously noted, when a BA is lost in the response sequence, there is a possibility that another transmitter node in the network (e.g., a hidden node) may potentially hijack the transmission sequence and collide with rest of the BAs.

To mitigate this potential problem, if the wireless medium is idle at the PIFS boundary, the primary can maintain the transmission sequence by sending a filler frame "F." "F" may be ignored by secondaries.

Note that this may only be effective if the medium is idle, which may not be true in some cases, since BAs are always transmitted by secondaries, and in case of a network collision the medium may not be idle. This may be most likely if the SCH frame is missed by the secondary.

Thus, there may be a tradeoff between taking an increased inter-secondary time or implementation complexity versus saving the transmit sequence in case SCH is missed.

Multicast Receiver Considerations

Each secondary in a multicast group may assist the primary with multicast distribution. This may include BA scheduling and window handling for each multicast group BA session, responding to poll frames, and adopting group session parameters.

The secondary may schedule its BA for the group BA session on receipt of, and based on, each SCH frame from the primary. In other words, the secondary may calculate at what time offset to transmit its BA for that multicast communication sequence. The time offset calculation may be performed as shown below.

After receipt of a SCH frame by Secondary "N", the secondary may check whether bit N of the bitmap scheduling BA frames is zero or not. If it is zero, no response is required, so there may be no need to calculate a time offset.

If bit N of the bitmap scheduling BA frames is one, the secondary may compute the number of ones between 0 and the (N−1)th bit inclusive of the bitmap. This number may be denoted "m."

If the SCH frame indicates a non-zero duration PPDU, the BA may be scheduled at SIFS+PPDU Duration+m X (BA duration+SIFS)+SIFS from frame-end of SCH frame.

If the SCH frame indicates a zero duration PPDU, the BA may be scheduled at SIFS+m X (BA duration+SIFS) from frame-end of SCH frame.

The BA duration may be calculated based on the PHY rate of the SCH frame and the BA packet length (e.g., as indicated in the SCH frame).

As an example, consider that an SCH frame may set the following parameters:
  bitmap—16'b0000_0000_0001_1010, PPDU duration—1960 us
  For Secondary 3: N=3.
  Based on bitmap 16'b0000_0000_0001_1010, m=1 (number of ones between bit2 and bit0)
  Schedule BA after SIFS+PPDU Duration+1 X (BA duration 30 SIFS)+SIFS=16+1960+(44+16)+16=2052 us Note that the secondary index may be assigned during multicast group setup by the primary.

With respect to window handling, multicast may have certain differences from unicast. In unicast, the originator bitmap matches the full-state bitmap of the recipient. For scalability reasons this may not be preferable for multicast, as it would require the originator to maintain bitmaps for each recipient.

As an alternative, the primary may not track the individual bitmap of each secondary in multicast; each secondary, however, may keep a full-state BA bitmap for each group BA session.

Since the number of simultaneous BA sessions may depend on the number of supported hardware BA full state sessions, for simplicity it may be assumed that there will be only one active group BA session.

Otherwise, BA handling of a group BA session may be similar to that of a unicast BA session, though re-ordering window flush time may be configured separately for the group BA stream, as it could potentially be a different number as compared to unicast.

With respect to group session parameters, the secondary may adopt group session parameters advertised by primary. For example, during initial group setup, the secondary may use these parameters to setup the BA window handling.

Group Membership Changes

As wireless media are dynamic, group members may leave or join. Further, based on the link conditions, the roles of primary and secondary may change. Though this may happen infrequently, it may be preferable to have minimal disruption to group communication when it does happen.

The primary infers each secondary's status through the secondary's responses, or through explicit poll frames. When the primary detects a missing secondary, it will immediately stop soliciting responses from the secondary and inform higher network layers. The higher network layers may take additional action based on this information.

The primary may periodically announce the membership list with the group session parameters. If a secondary is missing in the list, it may imply that the primary has either removed the secondary from consideration or the primary believes the secondary has left the group. If a secondary which did not wish to leave the group hears the announcement frame, it may send a unicast unsolicited response frame with the intention to join the group. The secondary may use an exponential backoff with respect to the number of primary announcements heard before sending an unsolicited response.

Additionally, higher network layers may be able to detect when the primary has left the multicast group, and may appoint a new primary and new set of secondaries. It may also be possible to appoint a new primary even if the primary hasn't left the group.

The newly chosen primary may re-use the group session parameters announced by the previous primary or may re-calculate the parameters. The former option may be preferable under many circumstances, as it may cause less disruption.

If the secondaries detect a new primary (with different parameters, for example), they may delete the context of the previous group and adopt the new group parameters.

Another scenario falling under the heading of group membership changes may be that of group dismantlement. This may be initiated if higher network layers indicate that the group is no longer needed. If this happens, the primary may send a message to all secondaries to dismantle the group. The primary and secondaries may then delete all context of the group communication.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus configured to perform multicast communication, wherein the apparatus is configured to perform wireless communication at any of a plurality of PHY rates, the apparatus comprising:
one or more processing elements configured to:
wirelessly transmit, to a multicast group, a block acknowledgment request associated with an aggregated payload frame comprising a plurality of subframes, wherein the block acknowledgement request is transmitted at a first PHY rate; and
receive, from the multicast group, acknowledgment and/or negative-acknowledgement messages associated with the aggregated payload frame according to a predetermined acknowledgement order, wherein the aggregated payload frame is transmitted at a second PHY rate, and wherein the first PHY rate is lower than the second PHY rate.

2. The apparatus of claim 1, wherein the one or more processing elements are further configured to:
wirelessly transmit the acknowledgement order to the multicast group.

3. The apparatus of claim 2, wherein the one or more processing elements are further configured to:
wirelessly transmit the acknowledgement order in a scheduling frame.

4. The apparatus of claim 1, wherein an acknowledgement message of the received acknowledgement and/or negative-acknowledgement messages comprises acknowledgement information for at least two of the plurality of subframes of the aggregated payload frame.

5. The apparatus of claim 1, wherein the one or more processing elements are further configured to:
wirelessly transmit, to the multicast group, duration information specifying an aggregated payload frame duration and an acknowledgement message duration.

6. The apparatus of claim 1, wherein said wirelessly transmitting the block acknowledgement request comprises wirelessly transmitting a scheduling frame that indicates a payload frame length of zero.

7. The apparatus of claim 1, wherein the apparatus further comprises:
wireless communication circuitry configured to wirelessly transmit the block acknowledgement request and receive the acknowledgement and/or negative-acknowledgement messages.

8. The apparatus of claim 1, wherein the wireless communication interface is configured to wirelessly receive the block acknowledgement request and transmit the acknowledgement or negative-acknowledgement message.

9. A method for a wireless device to perform multicast communication, wherein the wireless device is configured to perform wireless communication at any of a plurality of PHY rates, the wireless device comprising:
by the wireless device:
wirelessly transmitting, to a multicast group, a block acknowledgment request associated with an aggregated payload frame comprising a plurality of MAC protocol data units (MPDUs), wherein the block acknowledgement request is transmitted at a first PHY rate; and
receiving, from the multicast group, acknowledgement and/or negative-acknowledgement messages associated with the aggregated payload frame according to a previously established acknowledgement order, wherein the aggregated payload frame is transmitted at a second PHY rate, and wherein the first PHY rate is lower than the second PHY rate.

10. The method of claim 9, further comprising:
wirelessly transmitting the acknowledgement order to the multicast group.

11. The method of claim 10, further comprising:
wirelessly transmitting, to the multicast group, the acknowledgement order in a scheduling frame.

12. The method of claim 9, wherein an acknowledgement message of the received acknowledgement and/or negative-acknowledgement messages comprises acknowledgement information for each of the plurality of MPDUs of the aggregated payload frame.

13. The method of claim 9, further comprising:
wirelessly transmitting, to the multicast group, duration information specifying an aggregated payload frame duration and an acknowledgement message duration.

14. The method of claim 9, wherein said wirelessly transmitting the block acknowledgement request comprises wirelessly transmitting a scheduling frame which indicates a payload frame length of zero.

15. An apparatus configured for implementation in a wireless device, the apparatus comprising:
a wireless communication interface, wherein the wireless communication interface is configured to perform wireless communication at any of a plurality of PHY rates; and
one or more processing elements communicatively coupled to the wireless communication interface, wherein the one or more processing elements are configured to:
wirelessly receive, from a multicast device, a block acknowledgement request associated with an aggregated payload frame comprising a plurality of subframes, wherein the wireless device is a member of a multicast group of intended receiving devices of the aggregated payload frame, wherein the block acknowledgement request is transmitted at a first PHY rate, wherein the aggregated payload frame is transmitted at a second PHY rate, and wherein the first PHY rate is lower than the second PHY rate; and transmit, in response to the block acknowledgement request, an acknowledgement or a negative-acknowledgement message to the multicast device according to a predetermined acknowledgment order for the multicast group.

16. The apparatus of claim 15, wherein the one or more processing elements are further configured to:

wirelessly receive, from the multicast device, the acknowledgement order for the multicast group.

17. The apparatus of claim 16, wherein the one or more processing elements are further configured to:

wirelessly receive the acknowledgement order for the multicast group in a scheduling frame.

18. The apparatus of claim 15, wherein the acknowledgement or negative acknowledgement message comprises acknowledgement information for at least two of the plurality of subframes of the aggregated payload frame.

19. The apparatus of claim 15, wherein the one or more processing elements are further configured to:

wirelessly receive, from the multicast device, duration information specifying an aggregated payload frame duration and an acknowledgement message duration of the multicast group.

20. The apparatus of claim 15, wherein said wirelessly receiving the block acknowledgement request comprises wirelessly receiving a scheduling frame that indicates a payload frame length of zero.

* * * * *